(12) United States Patent
Agrawal

(10) Patent No.: US 7,154,933 B2
(45) Date of Patent: Dec. 26, 2006

(54) INTERFERENCE MANAGEMENT FOR SOFT HANDOFF AND BROADCAST SERVICES IN A WIRELESS FREQUENCY HOPPING COMMUNICATION SYSTEM

(76) Inventor: Avneesh Agrawal, 13040 Signature Point #29, San Diego, CA (US) 92121

( * ) Notice: Subject to any disclaimer, the term of this patent is extended or adjusted under 35 U.S.C. 154(b) by 299 days.

(21) Appl. No.: 10/608,914

(22) Filed: Sep. 25, 2003

(65) Prior Publication Data

US 2005/0069022 A1    Mar. 31, 2005

(51) Int. Cl.
*A04B 1/69* (2006.01)
(52) U.S. Cl. .................. 375/132; 375/130
(58) Field of Classification Search ............... 375/132, 375/135, 130, 133, 141; 370/350, 341, 329; 455/428, 103
See application file for complete search history.

(56) References Cited

U.S. PATENT DOCUMENTS

| | | | |
|---|---|---|---|
| 5,506,863 A * | 4/1996 | Meidan et al. | 375/134 |
| 5,907,545 A * | 5/1999 | Arai et al. | 370/342 |
| 6,031,864 A * | 2/2000 | Bauchot et al. | 375/133 |
| 6,075,990 A * | 6/2000 | Shin | 455/440 |
| 6,246,713 B1 | 6/2001 | Mattison | |
| 6,264,713 B1 * | 7/2001 | Lewis, II | 55/481 |
| 6,377,801 B1 * | 4/2002 | Kolev et al. | 455/428 |
| 6,657,985 B1 * | 12/2003 | Park | 370/342 |
| 6,658,044 B1 * | 12/2003 | Cho et al. | 375/135 |
| 6,882,677 B1 * | 4/2005 | Dehner et al. | 375/132 |
| 2004/0161018 A1 * | 8/2004 | Maric | 375/136 |
| 2004/0258136 A1 * | 12/2004 | Liu et al. | 375/133 |

* cited by examiner

*Primary Examiner*—Emmanuel Bayard
(74) *Attorney, Agent, or Firm*—Philip R. Wadsworth; Sandip S. Minhas; Milan I. Patel

(57) ABSTRACT

Techniques are provided to manage interference for soft handoff and broadcast services in a wireless frequency hopping communication system (e.g., an OFDMA system). These techniques may be used for the forward and reverse links. In a first scheme, an FH function $f_{sho}(r,T)$ is used for soft-handoff users, an FH function $f_{s_i}(k,T)$ is used for users not in soft handoff in each sector $s_i$, and the FH function $f_{s_i}(k,T)$ is modified to be orthogonal to the FH function $f_{sho}(r,T)$ if and when necessary. In a second scheme, the FH function $f_{sho}(r,T)$ used for soft-handoff users is defined to be orthogonal to or have low correlation with the FH function $f_{s_i}(k,T)$ used for users not in soft handoff in each sector $s_i$, so that modification of the FH function $f_{s_i}(k,T)$ is not needed. The FH function $f_{s_i}(k,T)$ for each sector may be defined to be pseudo-random with respect to the FH functions $f_{s_j}(k,T)$ for other sectors.

30 Claims, 5 Drawing Sheets

INTERFERENCE MANAGEMENT FOR SOFT HANDOFF AND BROADCAST SERVICES IN A WIRELESS FREQUENCY HOPPING COMMUNICATION SYSTEM

BACKGROUND

I. Field

The present invention relates generally to communication and more specifically to techniques for managing interference for soft handoff and broadcast services in a wireless frequency hopping (FH) communication system.

II. Background

In a frequency hopping communication system, data is transmitted on different frequency subbands in different time intervals, which may be referred to as "hop periods". These frequency subbands may be provided by orthogonal frequency division multiplexing (OFDM), other multi-carrier modulation techniques, or some other constructs. With frequency hopping, the data transmission hops from subband to subband in a pseudo-random manner. This hopping provides frequency diversity and allows the data transmission to better withstand deleterious path effects such as narrow-band interference, jamming, fading, and so on.

An orthogonal frequency division multiple access (OFDMA) system utilizes OFDM and can support multiple users simultaneously. For a frequency hopping OFDMA system, data for a given user may be sent on a "traffic" channel that is associated with a specific FH sequence. This FH sequence may be generated based on an FH function and the traffic channel number, as described below. The FH sequence indicates the specific subband to use for data transmission in each hop period. Multiple data transmissions for multiple users may be sent simultaneously on multiple traffic channels associated with different FH sequences. These FH sequences are defined to be orthogonal to one another so that only one traffic channel, and thus only one data transmission, uses each subband in each hop period. With these orthogonal FH sequences, the multiple data transmissions do not interfere with one another while enjoying the benefits of frequency diversity.

An OFDMA system may be deployed with multiple cells. A cell can refer to a base station in the system and/or the coverage area of the base station, depending on the context in which the term is used. A data transmission on a given subband in one cell acts as interference to another data transmission on the same subband in a neighboring cell. To randomize inter-cell interference, the FH sequences for each cell are typically defined to be pseudo-random with respect to the FH sequences for neighboring cells. With these pseudo-random FH sequences, interference diversity is achieved and the data transmission for a user in a given cell observes the average interference from the data transmissions for other users in other cells.

In a multi-cell OFDMA system, it is desirable to support "soft handoff", which is a process whereby a user communicates with multiple base stations simultaneously. Soft handoff can provide spatial diversity against deleterious path effects through transmission of data to or from multiple base stations at different locations. However, soft handoff is complicated by the use of frequency hopping. This is because the FH sequences for one cell are pseudo-random, and not orthogonal, to the FH sequences for neighboring cells in order to randomize inter-cell interference. If a user is in soft handoff with multiple base stations, then the soft-handoff user may be instructed to use an FH sequence for a designated one of these multiple base stations. The data transmission for the soft-handoff user will be orthogonal to the data transmissions for other users of the designated base station but will be pseudo-random with respect to the data transmissions for the users of other base stations. The soft-handoff user would cause interference to the users of the other base stations and would also receive interference from these users. The interference degrades the performance of all affected users.

There is therefore a need in the art for techniques to manage interference for soft handoff in a frequency hopping OFDMA system.

SUMMARY

Techniques are provided herein to manage interference in a wireless frequency hopping communication system (e.g., an OFDMA system). These techniques may be used to support soft handoff, broadcast services, and so on. These techniques may also be used for the forward link as well as the reverse link. For clarity, these techniques are described below for soft handoff with two sectors $s_1$ and $s_2$, where a sector is a portion of a cell.

In a first scheme for managing interference for soft handoff, an FH function $f_{sho}(r,T)$ is used for soft-handoff users, an FH function $f_{s_1}(k,T)$ is used for users not in soft handoff in sector $s_1$, an FH function $f_{s_2}(k,T)$ is used for users not in soft handoff in sector $s_2$, and the FH functions $f_{s_1}(k,T)$ and $f_{s_2}(k,T)$ are modified to be orthogonal to the FH function $f_{sho}(r,T)$ if and when necessary. A user is assigned traffic channel r, which is defined with the FH function $f_{sho}(r,T)$, upon entering soft handoff with sectors $s_1$ and $s_2$. The identifier (ID) for traffic channel r and the FH function $f_{sho}(r,T)$ are made known to other users in sectors $s_1$ and $s_2$. Each of the other users in sector $s_1$ then modifies the FH function $f_{s_1}(k,T)$ such that its traffic channel does not interfere with traffic channel r used by the soft-handoff user. Similarly, each of the other users in sector $s_2$ modifies the FH function $f_2(k,T)$ such that its traffic channel does not interfere with traffic channel r. Various methods for modifying the FH functions $f_{s_1}(k,T)$ and $f_{s_2}(k,T)$ are described below.

In a second scheme for managing interference for soft handoff, the FH function $f_{sho}(r,T)$ used for soft-handoff users and the FH function $f_{s_i}(k,T)$ used by each sector $s_i$ for users not in soft handoff are predefined to be orthogonal, so that modification of the FH function $f_{s_i}(k,T)$ is not needed. The FH function $f_{sho}(r,T)$ is used by both sectors $s_1$ and $s_2$ for soft-handoff users. Sector $s_1$ uses the FH function $f_{s_1}(k,T)$ for users not in soft handoff, and sector $s_2$ uses the FH function $f_{s_2}(k,T)$ for users not in soft handoff. The FH function $f_{sho}(r,T)$ is predefined to be orthogonal to, or have low correlation with, both of the FH functions $f_{s_1}(k,T)$ and $f_{s_2}(k,T)$. The FH function $f_{s_1}(k,T)$ may be defined to be pseudo-random with respect to the FH function $f_{s_2}(k,T)$. A predetermined number of (R) traffic channels may be defined with the FH function $f_{sho}(r,T)$ and used to support up to R soft-handoff users. For each sector $s_i$, N−R traffic channels may be defined with the FH function $f_{s_i}(k,T)$ and used for up to N−R other users not in soft handoff, where N is the total number of usable subbands.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
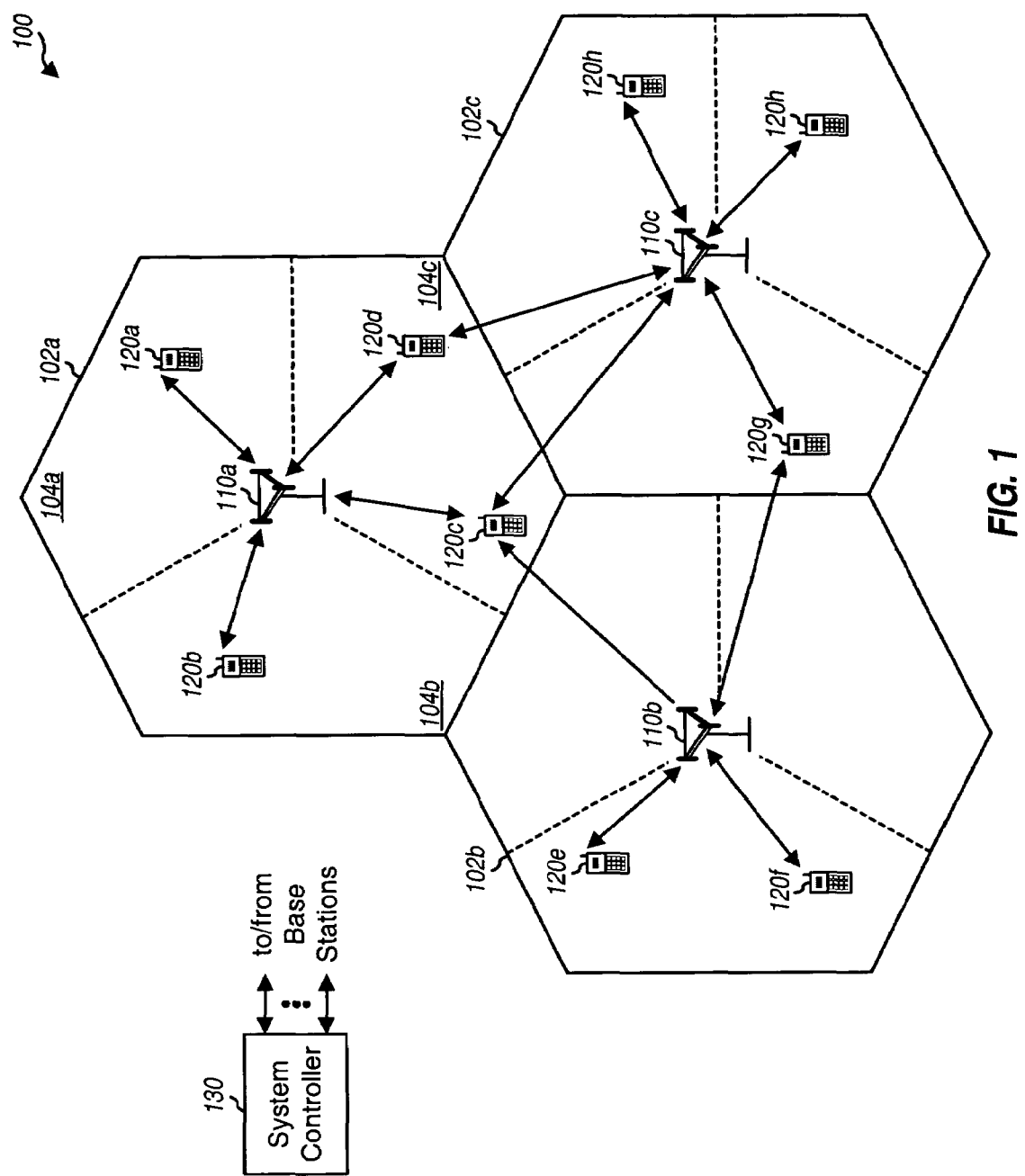
FIG. 1 shows an OFDMA system.

FIG. 1 shows an exemplary OFDMA system 100 that supports a number of users. System 100 includes a number of base stations 110 that support communication for a number of terminals 120. A base station is a fixed station used for communicating with the terminals and may also be referred to as an access point, a Node B, or some other terminology. Terminals 120 are typically dispersed throughout the system, and each terminal may be fixed or mobile. A terminal may also be referred to as a mobile station, a user equipment (UE), a wireless communication device, or some other terminology. Each terminal may communicate with one or more base stations on the forward link and/or one or more base stations on the reverse link at any given moment. This depends on whether or not the terminal is active, whether or not soft handoff is supported, and whether or not the terminal is in soft handoff. The forward link (i.e., downlink) refers to the communication link from the base station to the terminal, and the reverse link (i.e., uplink) refers to the communication link from the terminal to the base station.

A system controller 130 couples to base stations 110 and may perform a number of functions such as (1) coordination and control for base stations 110, (2) routing of data among these base stations, and (3) access and control of the terminals served by these base stations.

Each base station 110 provides coverage for a respective geographic area 102. For simplicity, the coverage area of each base station is often represented by an ideal hexagon. To increase capacity, the coverage area of each base station may be partitioned into multiple sectors 104. For example, each cell may be partitioned into three sectors, as shown in FIG. 1. In this case, for simplicity, each sector of a sectorized cell may be represented by an ideal 120° wedge that is ⅓ of the cell. Each sector may be served by a corresponding base transceiver subsystem (BTS). For a sectorized cell, the base station for that cell typically includes all of the BTSs for the sectors of that cell. The term "sector" can refer to a BTS and/or its coverage area, depending on the context in which the term is used. The following description assumes that each cell is partitioned into multiple sectors. For simplicity, in the following description, the term "base station" is used generically for both a fixed station that serves a cell and a fixed station that serves a sector.

OFDMA system 100 utilizes OFDM, which is a modulation technique that effectively partitions the overall system bandwidth into a number of (N) orthogonal frequency subbands. These subbands are also commonly referred to as tones, sub-carriers, bins, and frequency subchannels. With OFDM, each subband is associated with a respective sub-carrier that may be modulated with data. In some OFDM systems, only $N_D$ subbands are used for data transmission, $N_P$ subbands are used for pilot transmission, and $N_G$ subbands are not used and serve as guard subbands to allow the systems to meet spectral mask requirements, where $N_S = N_D + N_P + N_G$. For simplicity, the following description assumes that all N subbands can be used for data transmission.

1. Soft Handoff with Frequency Hopping

Figure 2:
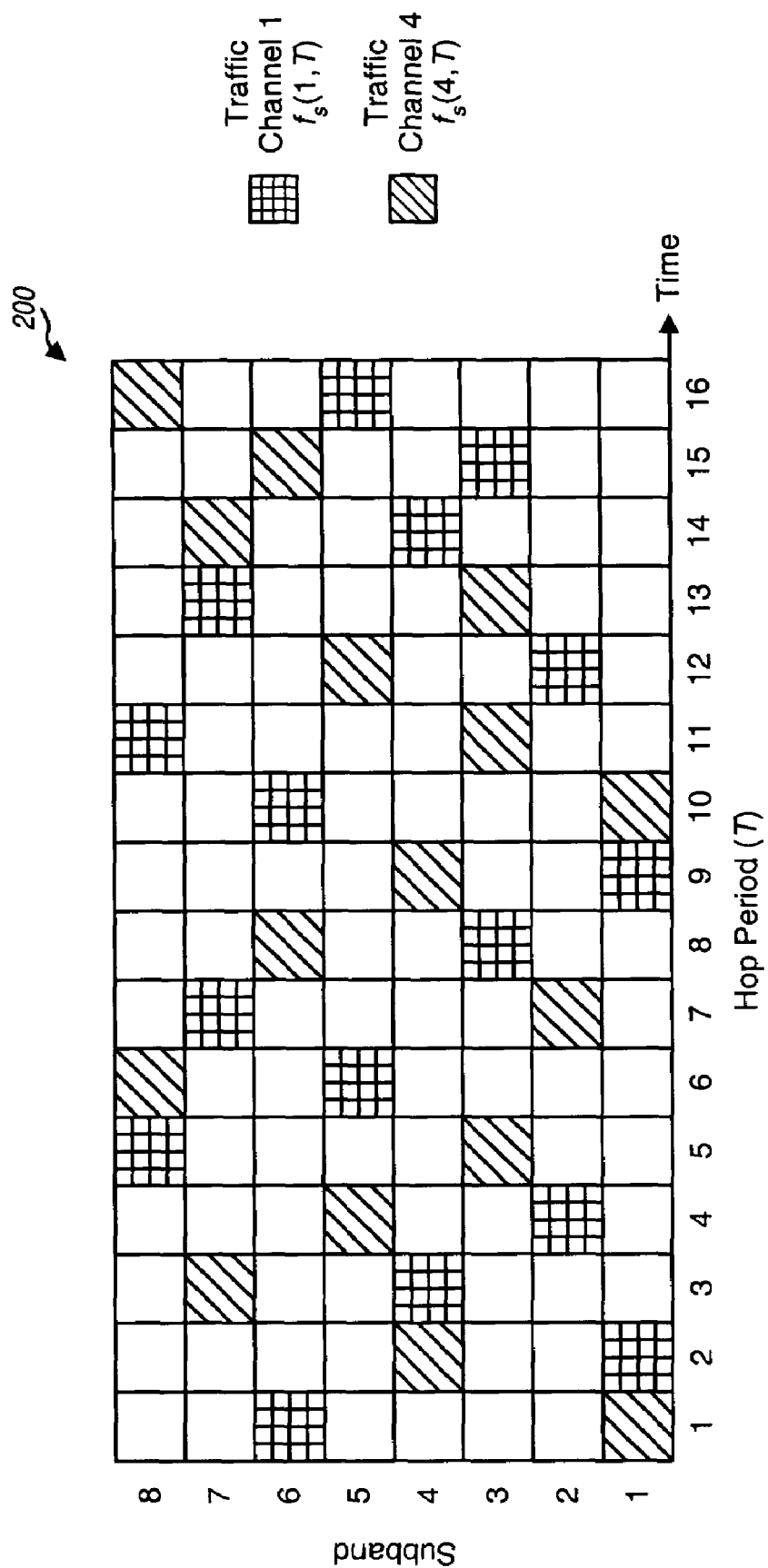
FIG. 2 illustrates frequency hopping for one sector in the OFDMA system.

FIG. 2 illustrates frequency hopping for one sector in the OFDMA system. Frequency hopping may be used to obtain various benefits including frequency diversity against deleterious path effects and interference randomization, as described above. For this example, N=8, and the eight subbands are assigned indices of 1 through 8. Up to eight traffic channels may be defined whereby each traffic channel uses one of the eight subbands in each hop period. A hop period may be defined to be equal to the duration of one or multiple OFDM symbols.

Each traffic channel is associated with a different FH sequence. The FH sequences for all traffic channels in the sector may be generated with an FH function $f_s(k,T)$, where k denotes the traffic channel number or ID and T denotes system time, which is given in units of hop period. N different FH sequences may be generated with N different values of k in the FH function $f_s(k,T)$. The FH sequence for each traffic channel indicates the particular subband to use for that traffic channel in each hop period. It can be seen in FIG. 2 that each traffic channel hops from subband to subband in a pseudo-random manner determined by its FH sequence. The FH sequence for traffic channel k may be given as follows:

$$i = f_s(k,T), \quad \text{Eq}(1)$$

where i is the index of the subband to use for traffic channel k for hop period T. Different values of k will result in different values of i for any given hop period T. Thus, different subbands are used for different traffic channels for each hop period.

FIG. 2 shows the subbands used for two exemplary traffic channels 1 and 4. The FH sequence and subbands used for traffic channel 1 are indicated by the cross-hashed boxes, and the FH sequence and subbands used for traffic channel 4 are indicated by the diagonal-hashed boxes. In this example, the FH sequence for traffic channel 4, $f_s(4,T)$, is a vertically shifted version of the FH sequence for channel 1, $f_s(1,T)$. The subbands used for traffic channel 4 are thus related to the subbands used for traffic channel 1 as follows: $f_s(4,T) = (f_s(1,T)+3) \mod N$.

To avoid intra-sector interference, the FH sequences for each sector $s_i$ may be defined to be orthogonal to one another. This orthogonality condition may be expressed as:

$$f_{s_i}(k,T) \neq f_{s_i}(m,T), \text{ for } k \neq m. \quad \text{Eq}(2)$$

Equation (2) states that no two traffic channels k and m use the same subband for any given hop period T. By allowing only one traffic channel to use each subband in each hop period, interference is avoided among multiple data transmissions sent on multiple traffic channels in the same sector. The orthogonality condition may be attained by defining the FH sequences for sector $s_i$ to be vertically shifted versions of one another, as shown in FIG. 2. The orthogonality condition may also be attained by defining the FH sequences in some other manners.

For a multi-sector OFDMA system, data transmissions for users in one sector interfere with data transmissions for users in another sector. A different FH function may be used for each sector.

To randomize inter-sector interference, the FH functions for different sectors should be pseudo-random. For example, the FH function $f_{s_1}(k,T)$ for sector $s_1$ may be defined to be pseudo-random with respect to the FH function $f_{s_2}(m,T)$ for sector $s_2$. In this case, the FH sequence used by sector $s_1$ for traffic channel k will be pseudo-random with respect to the FH sequence used by sector $s_2$ for traffic channel m. Interference between traffic channels k and m occurs whenever there is a "collision" between the FH sequences for these traffic channels, i.e., whenever $f_{s_1}(k,T)=f_{s_2}(m,T)$ and two traffic channels in two sectors use the same subband for the same hop period. However, the interference will be randomized due to the pseudo-random nature of the FH functions $f_{s_1}(k,T)$ and $f_{s_2}(m,T)$. In general, with pseudo-random FH functions, it is not possible to guarantee users in one sector to be orthogonal to users in another sector.

The FH sequences for each sector may thus be defined to be:

1. Orthogonal to each other to avoid intra-sector interference, and
2. Pseudo-random with respect to the FH sequences for other sectors to randomize inter-sector interference.

With the above constraints, a user assigned with traffic channel k by one sector will be orthogonal to all other users assigned with other traffic channels by the same sector. However, this user will not be orthogonal to all users in another sector, which uses a different FH function. Thus, a user that is in soft handoff with multiple sectors and assigned traffic channel r will not be orthogonal to all other users in these sectors, if the FH sequences for these sectors are defined as described above. In this case, soft handoff cannot be supported without introducing interference to/by the soft-handoff user.

To support soft handoff with multiple sectors while avoiding interference, orthogonal FH functions are used for soft-handoff users and for other users of these multiple sectors. Orthogonal FH functions may be obtained in various manners, some of which are described below. In the following description, it is assumed that the sectors (e.g., those supporting soft handoff for a given user) are operated synchronously. Synchronously operation is easily achieved for sectors belonging to the same cell or base station.

A. First Scheme—Modification of FH Functions for Soft Handoff

In a first scheme for avoiding interference for soft handoff, an FH function $f_{sho}(r,T)$ is used for the soft-handoff users, and the FH function $f_{s_i}(k,T)$ for each sector is modified to be orthogonal to the FH function $f_{sho}(r,T)$. As an example, to support soft handoff with two sectors $s_1$ and $s_2$, the FH function $f_{sho}(r,T)$ may be shared by both of these sectors. For a user in soft handoff with sectors $s_1$ and $s_2$ and assigned traffic channel r, the FH function $f_{sho}(r,T)$ is used to obtain the FH sequence for the assigned traffic channel r. The subband j used by this soft-handoff user for data transmission in each hop period T may be given as: $j=f_{sho}(r,T)$.

To maintain orthogonality between the soft-handoff user and all other users in both sectors $s_1$ and $s_2$, the FH function $f_{s_1}(k,T)$ for sector $s_1$ and the FH function $f_{s_2}(m,T)$ for sector $s_2$ may be modified as follows:

$$\tilde{f}_{s_1}(k,T) \neq f_{sho}(r,T), \text{ for } k \in K, \text{ and} \qquad \text{Eq(3a)}$$

$$\tilde{f}_{s_2}(m,T) \neq f_{sho}(r,T), \text{ for } m \in M, \qquad \text{Eq(3b)}$$

where $\tilde{f}_{s_1}(k,T)$ is the modified FH function for sector $s_1$;
$\tilde{f}_{s_2}(m,T)$ is the modified FH function for sector $s_2$;
K denotes the set of all active traffic channels in sector $s_1$; and
M denotes the set of all active traffic channels in sector $s_2$.

In equations (3a) and (3b), the system is assumed to be synchronous and the system time T is assumed to be common for all sectors.

Equation (3a) indicates that the FH sequences generated with the FH function $f_{sho}(r,T)$ and used for soft-handoff users are orthogonal to the FH sequences generated with the modified FH function $\tilde{f}_{s_1}(k,T)$ and used for other users in sector $s_1$. Equation (3b) indicates that the FH sequences generated with the FH function $f_{sho}(r,T)$ are also orthogonal to the FH sequences generated with the modified FH function $\tilde{f}_{s_2}(m,T)$ and used for other users in sector $s_2$. The same modification may be extended to any number of sectors. Some exemplary methods for obtaining the soft-handoff FH function $f_{sho}(r,T)$ and the modified FH functions $\tilde{f}_{s_1}(k,T)$ and $\tilde{f}_{s_2}(m,T)$ are described below.

In a first embodiment of the first scheme, the FH function $f_{s_i}(k,T)$ for each sector $s_i$ is modified as follows. When a user goes into soft handoff with multiple sectors, it is assigned traffic channel r defined with the FH function $f_{sho}(r,T)$. This user is also assigned traffic channel $v_i$ by each sector $s_i$ with which it is in soft handoff. The users in each sector have a priori knowledge of the FH function $f_{sho}(r,T)$ or may be signaled with this information. The traffic channel r assigned to the soft-handoff user is signaled to all other users in these multiple sectors. The traffic channel $v_i$ assigned to the soft-handoff user by each sector $s_i$ is also signaled to the other users in sector $s_i$. For example, the soft-handoff user may be assigned traffic channel $v_1$ by sector $s_1$ and traffic channel $v_2$ by sector $s_2$ where $v_1$ may or may not be equal to $v_2$. Traffic channel r would then be signaled to other users in both sectors $s_1$ and $s_2$, traffic channel $v_1$ would be signaled to other users in sector $s_1$, and traffic channel $v_2$ would be signaled to other users in sector $s_2$.

Each of the other users in sector $s_i$ has the following:
1. the FH function $f_{sho}(r,T)$ used for the soft-handoff user;
2. the ID for the traffic channel r assigned to the soft-handoff user and defined with the FH function $f_{sho}(r,T)$; and
3. the ID for the traffic channel $v_i$ assigned to the soft-handoff user by sector $s_i$ and defined with the FH function $f_{s_i}(k,T)$.

Traffic channel r is the one actually used by the soft-handoff user for data transmission.

Each user in sector $s_i$ may then define the modified FH function $\tilde{f}_{s_i}(k,T)$ for its sector $s_i$ as follows:

$$\tilde{f}_{s_i}(k,T) = \begin{cases} f_{s_i}(k,T) & \text{if } f_{s_i}(k,T) \neq f_{sho}(r,T) \\ f_{s_i}(v_i,T) & \text{otherwise} \end{cases} \qquad \text{Eq (4)}$$

Equation (4) indicates that each user in sector $s_i$ uses the subbands for its assigned traffic channel k if these subbands are not the same as the subbands for traffic channel r used by the soft-handoff user, i.e., if $f_{s_i}(k,T) \neq f_{sho}(r,T)$. Each user in sector $s_i$ uses the subbands for traffic channel $v_i$ whenever the subbands for its assigned traffic channel k are the same as the subbands for traffic channel r.

In effect, the soft-handoff user is allowed to use traffic channel r, which may not be orthogonal to the traffic channels for other users in sector $s_i$. The soft-handoff user is given higher priority and its data transmission is sent on traffic channel r. All other users in sector $s_i$ use their assigned traffic channels if there are no collisions with traffic channel r. These users avoid interference with the soft-handoff user by using traffic channel $v_i$ whenever their traffic channels collide with traffic channel r. The FH sequences for the traffic channels assigned to these other users and the FH sequence for traffic channel $v_i$ are orthogonal to one another because they are all generated with the same FH function $f_{s_i}(k,T)$. No interference is thus caused between the soft-handoff user and the other users in sector $s_i$.

Figure 3:
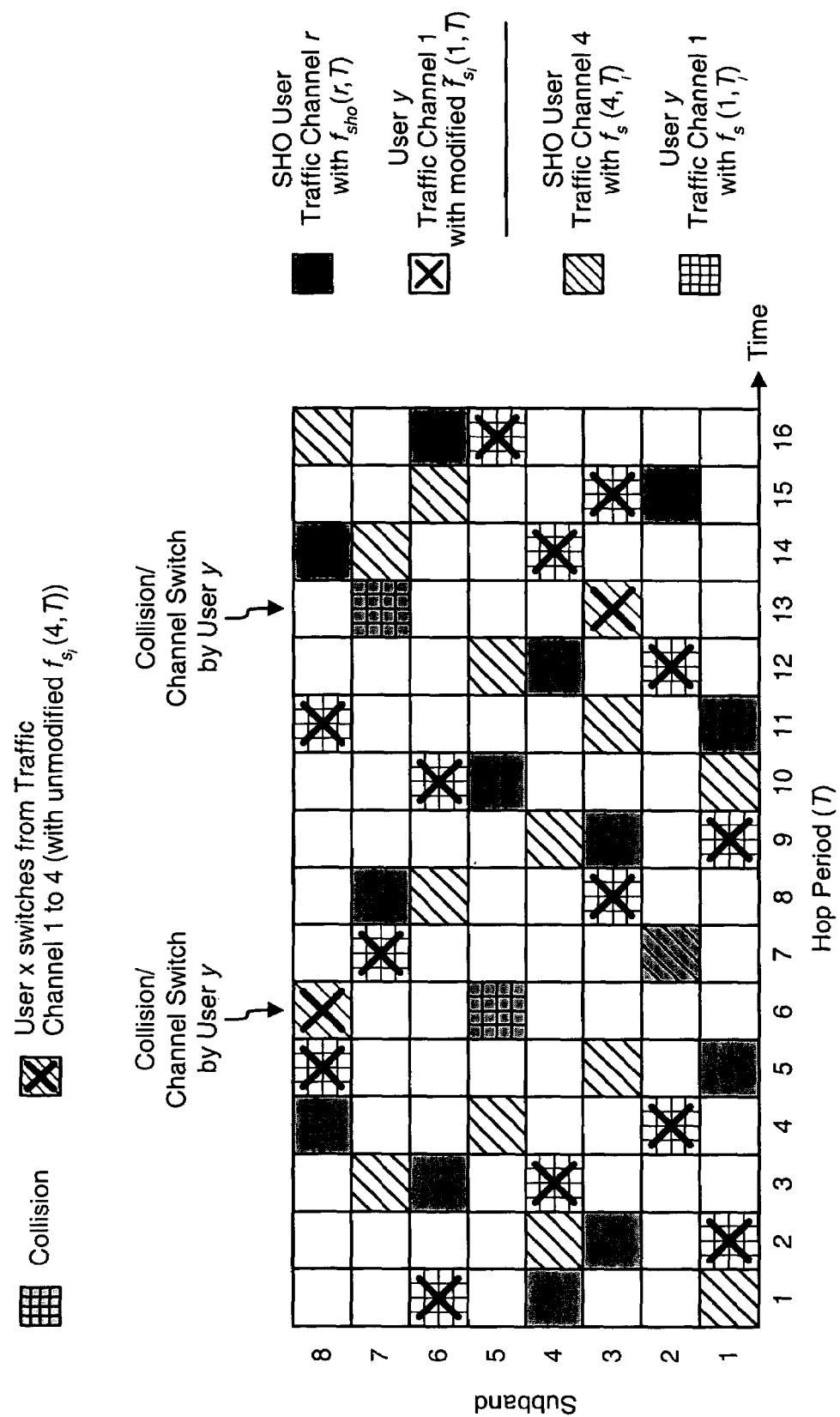
FIG. 3 illustrates modification of an FH function due to a soft-handoff user.

FIG. 3 illustrates the modification of an FH function due to a soft-handoff user. For this example, the FH sequence for traffic channel 1 (shown by the cross-hashed boxes) and the FH sequence for traffic channel 4 (shown by the diagonal-hashed boxes) are generated with the FH function $f_{s_i}(k,T)$ for sector $s_i$, as described above. User y is assigned traffic channel 1 by sector $s_i$. A soft-handoff user is assigned traffic channel 4 by sector $s_i$. The soft-handoff user is also assigned traffic channel r defined with the FH function $f_{sho}(r,T)$. The FH sequence for traffic channel r is shown by the shaded boxes in FIG. 3.

The soft-handoff user uses traffic channel r for data transmission. User y uses traffic channel 1 for data transmission in hop periods 1 through 5 when there are no collisions between traffic channel 1 and traffic channel r. A collision occurs in hop period 6, in which case user y uses traffic channel 4 (i.e., subband 8) for data transmission. User y again uses traffic channel 1 for data transmission in hop periods 7 through 12 when there are no collisions between traffic channels 1 and r. A collision again occurs in hop period 13, in which case user y uses traffic channel 4 (i.e., subband 3) for data transmission. User y then uses traffic channel 1 for data transmission in hop periods 14 through 16 when there are no collisions between traffic channels 1 and r. The FH sequence generated with the modified FH function $\tilde{f}_{s_i}(k,T)$ for traffic channel 1 is shown by the "X" boxes.

The modification described above may be extended to any number of soft-handoff users. For each hop period, each user that is not in soft handoff in sector $s_i$ determines whether or not its traffic channel k collides with traffic channel r for each of the soft-handoff users. If there is a collision, then the user that is not in soft handoff uses traffic channel $v_i$ assigned by its sector $s_i$ to the soft-handoff user with whom the collision has occurred.

The users in each sector $s_i$ perform modification of the FH function $f_{s_i}(k,T)$ whenever there is at least one soft-handoff user in the sector. Traffic channels r and $v_i$ assigned to a soft-handoff user may be signaled to other users in sector $s_i$ whenever the soft-handoff user moves in or out of soft handoff with sector $s_i$. The FH function $f_{sho}(r,T)$ may also be signaled to the other users if needed. The signaling may be achieved via a designated control channel. The other users in sector $s_i$ monitor the control channel for this information and perform the modification as needed.

Each user that is in soft handoff with multiple sectors is assigned one traffic channel r defined with the FH function $f_{sho}(r,T)$, which is common and shared by these multiple sectors. Each soft-handoff user is also assigned one traffic channel $v_i$ by each of the multiple sectors with which it is in soft handoff. Each soft-handoff user thus uses one traffic channel from each of the sectors supporting soft handoff for this user. The number of possible traffic channels reduces by one in all sectors because of the soft-handoff user. This is similar to the forward link in an IS-95 CDMA system whereby a user in soft handoff uses up a Walsh code in each sector with which it is in soft handoff.

In a second embodiment of the first scheme, for a user that is in soft handoff with multiple sectors, one of the sectors is designated as the "serving" or "anchor" sector, and only the FH functions for the other sectors need to be modified.

For example, user x may initially communicate with sector $s_1$ and is assigned traffic channel r by sector $s_1$. User x may subsequently move within the coverage of sector $s_2$ and is assigned traffic channel v by sector $s_2$. If sector $s_1$ is designated as the serving sector, then user x continues to communicate with both sectors $s_1$ and $s_2$ on traffic channel r, which was assigned by sector $s_1$. In effect, the FH function $f_{s_1}(r,T)$ for sector $s_1$ is used as the FH function $f_{sho}(r,T)$ for the soft-handoff user. The other users in sector $s_2$ would then modify the FH function $f_{s_2}(k,T)$ for sector $s_2$ to be orthogonal with traffic channel r, as follows:

$$\tilde{f}_{s_2}(k, T) = \begin{cases} f_{s_2}(k, T) & \text{if } f_{s_2}(k, T) \neq f_{s_1}(r, T) \\ f_{s_2}(v, T) & \text{otherwise} \end{cases} \qquad \text{Eq (5)}$$

Alternatively, user x may initially communicate with sector $s_1$ and is assigned traffic channel v by sector $s_1$ and may subsequently move within the coverage of sector $s_2$ and is assigned traffic channel r by sector $s_2$. If sector $s_2$ is designated as the serving sector, then user x communicates with both sectors $s_1$ and $s_2$ on traffic channel r, which was assigned by sector $s_2$. In effect, the FH function $f_{s_2}(k,T)$ for sector $s_2$ is used as the FH function $f_{sho}(r,T)$ for the soft-handoff user. The other users in sector $s_1$ would then modify the FH function $f_{s_1}(k,T)$ for sector $s_1$ to be orthogonal with traffic channel r, as follows:

$$\tilde{f}_{s_1}(k, T) = \begin{cases} f_{s_1}(k, T) & \text{if } f_{s_1}(k, T) \neq f_{s_2}(r, T) \\ f_{s_1}(v, T) & \text{otherwise} \end{cases} \qquad \text{Eq (6)}$$

For the second embodiment, the other users in the serving sector do not need to modify their FH function. Only the users in the other sector(s) need to modify their FH functions to be orthogonal with the soft-handoff user. The second embodiment can thus reduce the amount of signaling required to support soft handoff.

Several embodiments have been described above for modifying FH functions to avoid interference with soft-handoff users. The FH functions may also be modified in other ways, and this is within the scope of the invention. In general, the FH function $f_{s_i}(k,T)$ for each sector supporting soft handoff may be modified to be orthogonal to, or have low correlation with, the FH function $f_{sho}(r,T)$ used for soft-handoff users.

Figure 4:
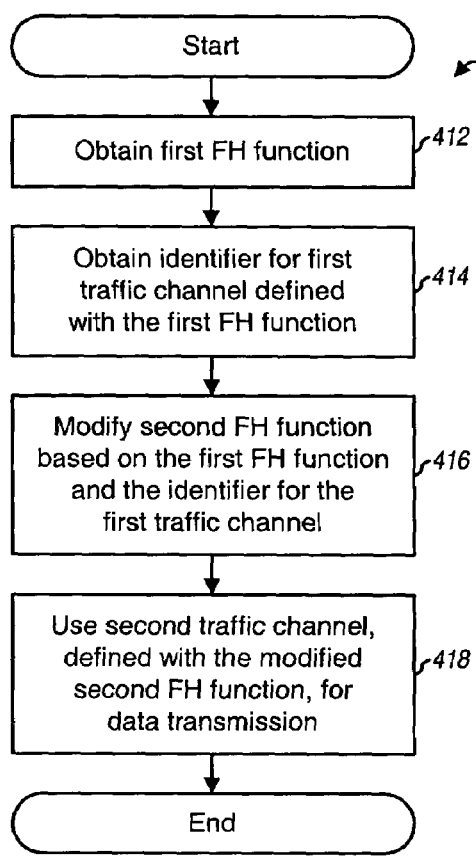
FIG. 4 shows a process for managing interference through the modification of the FH function.

FIG. 4 shows a flow diagram of an exemplary process 400 for managing interference in a wireless frequency hopping communication system through the modification of the FH function. Process 400 may be performed by both a terminal and a base station in a sector whenever there is at least one soft-handoff user in the sector. Initially, a first FH function is obtained (step 412). An identifier for a first traffic channel defined with the first FH function is also obtained (step 414). The first FH function corresponds to $f_{sho}(r,T)$ in the above description, and the first traffic channel identifier corresponds to r.

A second FH function is then modified based on the first FH function and the first traffic channel identifier to obtain a modified second FH function (step 416). The second FH function corresponds to $f_{s_i}(k,T)$ in the above description, and the modified second FH function corresponds to $\tilde{f}_{s_i}(k,T)$. An identifier for a third traffic channel defined with the second FH function may also be obtained. The third traffic channel identifier corresponds to $v_t$ in the above description. In this case, the second FH function is further modified based on the third traffic channel identifier, e.g., as shown in equation (4). The second FH function is modified such that a second traffic channel defined with the modified second FH function and the first traffic channel are orthogonal or have low correlation. The second traffic channel is used for data transmission on the forward link and/or reverse link (step 418).

The first FH function may be used for soft-handoff users, and the second FH function may be used for users not in soft handoff (for the first embodiment described above). The first FH function may also be for one base station in the system and the second FH function may be for another base station in the system (for the second embodiment described above).

B. Second Scheme—Pre-Defined FH Functions for Soft Handoff

In a second scheme for avoiding interference for soft handoff, each sector uses one FH function $f_{s_i}(k,T)$ for users not in soft handoff and another FH function $f_{sho}(r,T)$ for users in soft handoff. The FH function $f_{sho}(r,T)$ is shared by multiple sectors for which soft handoff is supported. For each of these multiple sectors, the FH functions $f_{s_i}(k,T)$ and $f_{sho}(r,T)$ are predefined to be orthogonal, which may be expressed as:

$$f_{s_i}(k,T) \neq f_{sho}(r,T), \text{ for } i \in I, \qquad \text{Eq(7)}$$

where I is the set of all sectors supporting soft handoff. The constraint in equation (7) ensures orthogonality between soft-handoff users and the other users in these multiple sectors. The FH functions $f_{s_i}(k,T)$, for $i \in I$, for the multiple sectors may be pseudo-random with respect to each other.

As an example, consider a case whereby soft handoff is supported by two sectors $s_1$ and $s_2$. Sector $s_1$ uses the FH function $f_{s_1}(k,T)$ for users not in soft handoff and the FH function $f_{sho}(r,T)$ for users in soft handoff. Sector $s_2$ uses the FH function $f_{s_2}(k,T)$ for users not in soft handoff and the same FH function $f_{sho}(r,T)$ for users in soft handoff. The FH function $f_{sho}(r,T)$ is orthogonal to both of the FH functions $f_{s_1}(k,T)$ and $f_{s_2}(k,T)$. The FH function $f_{s_1}(k,T)$ may be pseudo-random with respect to the FH function $f_{s_2}(k,T)$. A predetermined number of (R) traffic channels may be defined with the FH function $f_{sho}(r,T)$ and used to support up to R soft-handoff users for sectors $s_1$ and $s_2$. For each sector, N–R traffic channels may be defined with the FH function $f_{s_i}(k,T)$ for that sector and used for up to N–R other users not in soft handoff in that sector. Each traffic channel used for soft handoff occupies one traffic channel for each of the multiple sectors supporting soft handoff. To efficiently utilize capacity, the number of soft-handoff traffic channels may be selected to match the expected number of soft-handoff users.

For the above example, a user is assigned one of the traffic channels defined with the FH function $f_{sho}(r,T)$ upon going into soft handoff with sectors $s_1$ and $s_2$. The other users in both sectors $s_1$ and $s_2$ can continue to use their assigned traffic channels, without modification, because their traffic channels are orthogonal to the traffic channel assigned to the soft handoff. The soft-handoff user may be assigned one of the traffic channels defined with the FH function $f_{s_i}(k,T)$ upon exiting soft handoff, so that the soft-handoff traffic channel can be assigned to another user.

The second scheme requires a smaller amount of signaling to support soft handoff. In particular, only the soft-handoff user needs to be informed what traffic channel to use upon entering and exiting soft handoff. No signaling is required for the other users in the sectors supporting soft handoff. However, for the second scheme, resources are reserved to support soft handoff even when there are no soft-handoff users.

Figure 5:
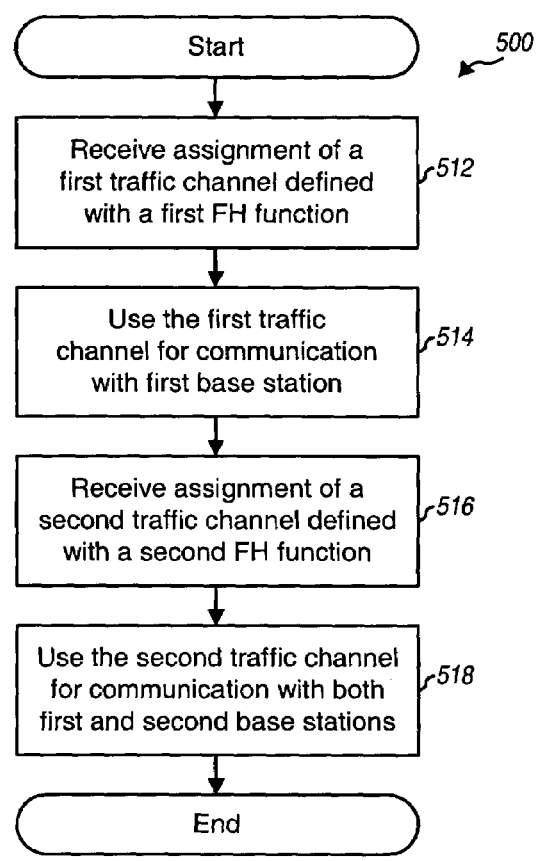
FIG. 5 shows a process for managing interference through the use of FH functions predefined to be orthogonal.

FIG. 5 shows a flow diagram of an exemplary process 500 for managing interference in a wireless frequency hopping communication system through the use of FH functions predefined to be orthogonal or have low correlation. Initially, an assignment of a first traffic channel defined with a first FH function (e.g., $f_{s_1}(k,T)$) is received (step 512). The first traffic channel is used for communication on the forward link and/or reverse link with a first base station (step 514). An assignment of a second traffic channel defined with a second FH function (e.g., $f_{sho}(r,T)$) is received (step 516). The first and second FH functions are orthogonal or have low correlation. The second traffic channel is then used for communication on the forward link and/or reverse link with both the first base station and a second base station (step 518). The second base station is associated with a third FH function (e.g., $f_{s_2}(k,T)$) used to define its traffic channels. The second and third FH functions are orthogonal or have low correlation. The first FH function is pseudo-random with respect to the third FH function.

Two specific schemes for avoiding interference for soft handoff have been described above. Other schemes may also be devised based on the above description, and this is within the scope of the invention.

2. FH Functions

FH functions used to generate FH sequences for the traffic channels may be defined in various manners. An exemplary design for the FH functions is described below. For this design, each sector is assigned a unique pseudo-random number (PN) code, which may be generated with a linear feedback shift register (LFSR). For example, the short PN codes defined by IS-95 and IS-2000 may be used for the FH functions. For each sector, the LFSR for that sector is updated in each hop period T, and the content of the LFSR contains a new value for the PN code for that sector for that hop period T. The binary number corresponding to the B least significant bits (LSBs) in the LFSR for sector $s_i$ may be denoted as $PN_i(T)$, where $B = \log_2(N)$. The FH function $f_{s_i}(k,T)$ for sector $s_i$ may then be defined as:

$$f_{s_i}(k,T) = (PN_i(T) + k) \bmod N. \qquad \text{Eq(8)}$$

To simplify implementation, the PN codes for different sectors may be defined to be different time shifts of a common PN code, similar to that used for IS-95 and IS-2000 systems. In this case, each sector is assigned a unique time-shift, and the PN code for that sector can be identified by the assigned time-shift. The common PN code may be denoted as PN(T), the time-shift assigned to sector $s_i$ may be denoted as $\Delta T_i$, and the binary number in the LFSR for sector $s_i$ may be denoted as $PN(T+\Delta T_i)$. The FH function $f_{s_i}(k,T)$ for sector $s_i$ may then be defined as:

$$f_{s_i}(k,T) = (PN(T+\Delta T_i) + k) \bmod N. \qquad \text{Eq(9)}$$

Each sector can signal its time-shift $\Delta T_i$ to specify its PN code and thus its FH function $f_{s_i}(k,T)$. This design can readily support soft handoff with more than two sectors.

The above design for the FH functions may be advantageously used with the first scheme described above, which modifies FH functions for soft handoff. For the first embodiment of the first scheme, the FH function $f_{sho}(r,T)$ used for soft handoff may be defined with a time-shift $\Delta T_{sho}$ that is unique with respect to the time-shifts assigned to the sectors. When a user goes into soft handoff with multiple sectors, the unique time-shift $\Delta T_{sho}$ for the FH function $f_{sho}(r,T)$ may be signaled to all other users in these multiple sectors. For the second embodiment of the first scheme, whereby the FH function for the serving sector is used as the FH function $f_{sho}(r,T)$, the unique time-shift for the serving sector is signaled to other users in other sector(s). For both embodiments, the other users are able to ascertain the FH function $f_{sho}(r,T)$ based on the signaled time-shift and can modify their FH functions accordingly.

The above design may also be used to obtain the FH functions for the second scheme described above, which uses pre-defined FH functions for soft handoff. A specific time-shift (e.g., $\Delta T_{sho}=0$) is used for the FH function $f_{sho}(r,T)$, and a unique time-shift $\Delta T_i$ is assigned to each sector, where $\Delta T_i \neq \Delta T_{sho}$. The R traffic channels for soft handoff may be defined with the time-shift $\Delta T_{sho}$, as follows:

$$f_{sho}(r,T)=(PN(T+\Delta T_{sho})+r) \bmod N, \qquad \text{Eq}(10)$$

where r is the index for the traffic channels defined with the FH function $f_{sho}(r,T)$ and $r=\{1, \ldots, R\}$. The FH function $f_{s_i}(k,T)$ for sector $s_i$ may then be defined as:

$$f_{s_i}(k, T) = \begin{cases} (PN(T + \Delta T_i) + k) \bmod N & \text{if no collision with traffic channel } r \\ (PN(T + \Delta T_i) + v) \bmod N & \text{otherwise} \end{cases} \qquad \text{Eq (11)}$$

where k is the index for the traffic channels defined with the FH function $f_{s_i}(k,T)$ for sector $s_i$, with $k=\{1, \ldots, K\}$ and $K=N-R$, and v is the index for the traffic channels assigned to soft-handoff users by sector $s_i$. In equation (11), a collision with traffic channel r occurs if $(PN(T+\Delta T_i)+k) \bmod N$ is equal to $(PN(T+\Delta T_{sho})+r) \bmod N$. In this case, the subband indicated by $(PN(T+\Delta T_i)+v) \bmod N$ is used for traffic channel k. Equation (11) effectively uses the modification techniques described above to obtain the FH function $f_{s_i}(k,T)$ for each sector $s_i$. Equation (11) may also be viewed as a combination of equations (4), (9), and (10), whereby the FH function $f_{s_i}(k,T)$ for each sector $s_i$ is obtained as shown in equation (9) and then modified as shown in equation (4) to obtain the modified FH function used for sector $s_i$. As noted above, users not in soft handoff use the traffic channels assigned by their sectors and defined with the FH functions $f_{s_i}(k,T)$. Users in soft handoff use the traffic channels defined with the FH function $f_{sho}(r,T)$.

An exemplary design has been described above for obtaining FH functions that may be used for soft handoff. In general, the constraints described above for soft handoff may be met by numerous FH functions that may be defined in other manners.

3. Multi-Cell System

For simplicity, the techniques for managing interference have been specifically described for two sectors in some of the description above. In a multi-cell system, there may be many cells, and each cell may be partitioned into multiple (e.g., three) sectors. Soft handoff may be supported in various manners.

In one embodiment, each sector has a different shared FH function with each of its neighboring sectors. The shared FH function for each pair of sectors is used for users in soft handoff with that pair of sectors. For each user in soft handoff with a pair of sectors, the shared FH function for that sector pair and the assigned traffic channel are signaled to the soft-handoff user. For the design described above whereby the FH functions for different sectors are defined with different time-shifts, the unique time-shift for the FH function $f_{sho}(r,T)$ may be signaled whenever a user goes into soft handoff.

In another embodiment, one shared FH function is used for soft handoff for all sectors in the system. This embodiment may be advantageously used, for example, in conjunction with the second scheme described above whereby the FH function $f_{sho}(r,T)$ is predefined. The FH function $f_{sho}(r,T)$ may be known to all users a priori and would not need to be signaled each time a user goes into soft handoff. A soft-handoff user only needs to be informed of the assigned traffic channel r. For this embodiment, a user in soft handoff with sectors $s_1$ and $s_2$ may use the same traffic channel as another user in soft handoff with sectors $s_3$ and $s_4$. In this case, their data transmissions would interfere with one another. However, two users in soft handoff with two different pairs of sectors are likely to cause only small amounts of interference to each other. This scenario may be avoided or minimized by network signaling (e.g., via system controller 130) that informs each sector of the traffic channels used by neighboring sectors.

4. Soft Handoff Advantages

The techniques described herein can provide various advantages for both the forward link and reverse link. Some of these advantages are enumerated below.

On the reverse link, the data transmission from a user in soft handoff with multiple sectors is received and processed by each of these sectors. The advantages obtained by the soft-handoff user are that it:

1. Benefits from soft-handoff diversity gain;
2. Does not observe interference from other users in the multiple sectors; and
3. Does not cause interference to other users in the multiple sectors.

The first benefit (i.e., diversity gain) is the same as in a CDMA system. The second and third benefits are unique to an OFDMA system because interference to/by a soft-handoff user may be avoided through the use of the techniques described herein. Users at the edge of a sector require large amounts of transmit power to communicate with their base stations and typically cause a disproportionate amount of inter-sector interference. Thus, removing this interference may provide a big advantage for all users.

On the forward link, soft handoff may be supported by various designs. In one design, multiple sectors transmit data at the same time to a soft-handoff user, such as in a CDMA system that implements IS-2000 (which is commonly referred to as a "1x" system). For this design, the advantages on the forward link are similar to those on the reverse link. In another design, only one of the sectors (the best sector) transmits data to the user at any given moment. The best sector may be the sector that is received the strongest by the user. This design is used in a CDMA system that implements IS-856 (which is commonly referred to as a "1xEV-DO" system). For this design, the advantages obtained by the soft-handoff user are that it:

1. Does not observe interference from other users in the multiple sectors; and
2. Does not cause interference to other users in the multiple sectors.

5. Broadcast Services

Broadcast is the transmission of data to all users in a designated broadcast area, which may be a single sector or multiple sectors. Broadcast services may be categorized into two types:

1. Sector-specific broadcasts—broadcast of data to users within a single sector; and
2. Regional broadcasts—broadcast of data to users within a region composed of two or more sectors (e.g., several adjacent sectors).

Since a broadcast transmission is intended to be received by all users located within the broadcast area, the broadcast data rate is normally determined by the channel conditions of the worst-case user in the broadcast area. For a CDMA system, the worst-case user is typically located at the edge of a sector and has a low carrier-to-total-interference-and-noise ratio (C/I), where the interference and noise power is typically dominated by interference from other sectors.

The techniques described herein may be advantageously used to support broadcast services in an OFDMA system. For regional broadcast service, the interference from other sectors can be eliminated using the techniques described herein. An FH function $f_{bc}(b,T)$ may be defined for broadcast services. The same FH function $f_{bc}(b,T)$ may be used for regional broadcast service by all sectors within the region. Each sector transmits broadcast data on a broadcast channel b defined with the FH function $f_{bc}(b,T)$. In one scheme, the FH function $f_{s_i}(k,T)$ for each sector in the region may be modified to be orthogonal to the FH function $f_{bc}(b,T)$. In another scheme, the FH function $f_{bc}(b,T)$ is predefined to be orthogonal to the FH functions $f_{s_i}(k,T)$ for all sectors in the broadcast region. In any case, interference on the broadcast channel is avoided and higher data rate may be used for the broadcast channel. Since the same broadcast stream is sent on the broadcast channel by all sectors in the region, various transmit diversity techniques (e.g., time varying phase offsets) may be used to avoid constant destructive interference. The FH function $f_{bc}(b,T)$ and the broadcast channel b may be made known a priori to the users in the region. No additional signaling would be needed to support broadcast service.

For sector-specific broadcast service, each sector can avoid interference on its broadcast channel. For example, the broadcast channel b and the FH function $f_{bc}(b,T)$ may be signaled to other sectors. The FH function $f_{s_i}(k,T)$ for each of these sectors may be modified to be orthogonal to the FH function $f_{bc}(b,T)$. Alternatively, no attempt may be made to avoid interference on the broadcast channel. In this case, each sector transmits broadcast data on its broadcast channel, which experiences interference from other sectors.

6. System

Figure 6A:
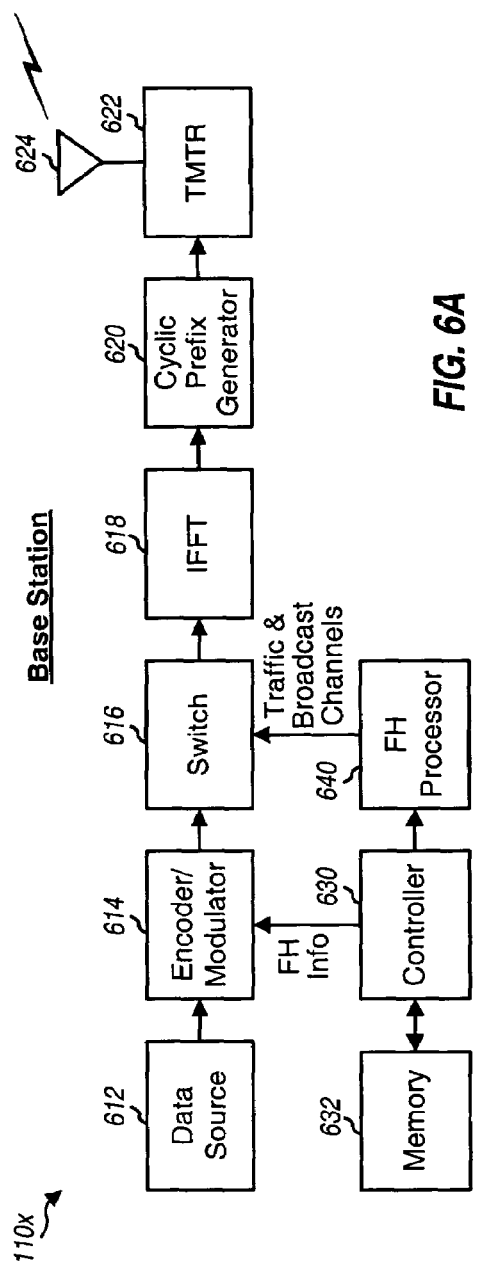
FIGS. 6A and 6B show block diagrams of a base station and a terminal, respectively, in the OFDMA system.

FIG. 6A shows a block diagram of an embodiment of a base station 110x in OFDMA system 100. For simplicity, only the transmitter portion of base station 110x is shown in FIG. 6A. Also for simplicity, data transmission for only one traffic channel and one broadcast channel is described below.

Within base station 110x, an encoder/modulator 614 receives traffic data and broadcast data from a data source 612 and control data and other data from a controller 630. The traffic data is designated for transmission on traffic channel k to a specific terminal. The broadcast data is designated for transmission on broadcast channel b to all terminals under the coverage of base station 110x. The control data includes FH information. The FH information may include the FH function $f_{bc}(b,T)$, the ID for broadcast channel b, information used to modify the FH function $f_{s_i}(k,T)$ for base station 110x (e.g., the FH function $f_{sho}(r,T)$ and the IDs for traffic channels r and $v_t$ assigned to each user in soft handoff with base station 110x), and so on. Encoder/modulator 614 formats, encodes, interleaves, and modulates the received data and provides modulation symbols (or simply, "data symbols"). Each modulation symbol is a complex value for a specific point in a signal constellation for the modulation scheme used for that modulation symbol.

A switch 616 receives the data symbols and multiplexes these symbols onto the proper subbands. The specific subband to use for traffic channel k in each hop period T is determined by the FH sequence for the traffic channel. This FH sequence is generated by an FH processor 640 with either the FH function $f_{s_i}(k,T)$ or the modified FH function $\tilde{f}_{s_i}(k,T)$, depending on whether or not modification to the FH function is needed, as indicated by the FH information. The specific subband to use for broadcast channel b in each hop period T is determined by the FH sequence for the broadcast channel. This FH sequence is generated by FH processor 640 with the FH function $f_{bc}(b,T)$.

Switch 616 provides the data symbols to the proper subbands for traffic channel k and broadcast channel b. Traffic channel k dynamically hops from subband to subband in a pseudo-random manner determined by the FH sequence for the traffic channel (e.g., as shown in FIGS. 2 and 3). Similarly, broadcast channel b dynamically hops from subband to subband in a pseudo-random manner determined by the FH sequence for the broadcast channel. Switch 616 may also provide pilot symbols on pilot subbands and a signal value of zero for each subband not used for pilot or data transmission. For each OFDM symbol period, switch 616 provides N output symbols (comprised of data symbols, pilot symbols, and zeros) for the N subbands.

An inverse fast Fourier transform (IFFT) unit 618 receives the N symbols for each OFDM symbol period. IFFT unit 618 then transforms the N symbols to the time domain using an N-point inverse FFT to obtain a "transformed" symbol that contains N time-domain samples. A cyclic prefix generator 620 repeats a portion of each transformed symbol to form an OFDM symbol that contains $N+C_p$ samples, where $C_p$ is the number of samples being repeated. The repeated portion is often referred to as a cyclic prefix and is used to combat inter-symbol interference (ISI) caused by frequency selective fading. An OFDM symbol period corresponds to the duration of one OFDM symbol, which is $N+C_p$ sample periods. Cyclic prefix generator 620 provides a stream of OFDM symbols. A transmitter unit (TMTR) 622 then processes the OFDM symbol stream to obtain a modulated signal, which is transmitted from an antenna 624 to the terminal.

Figure 6B:
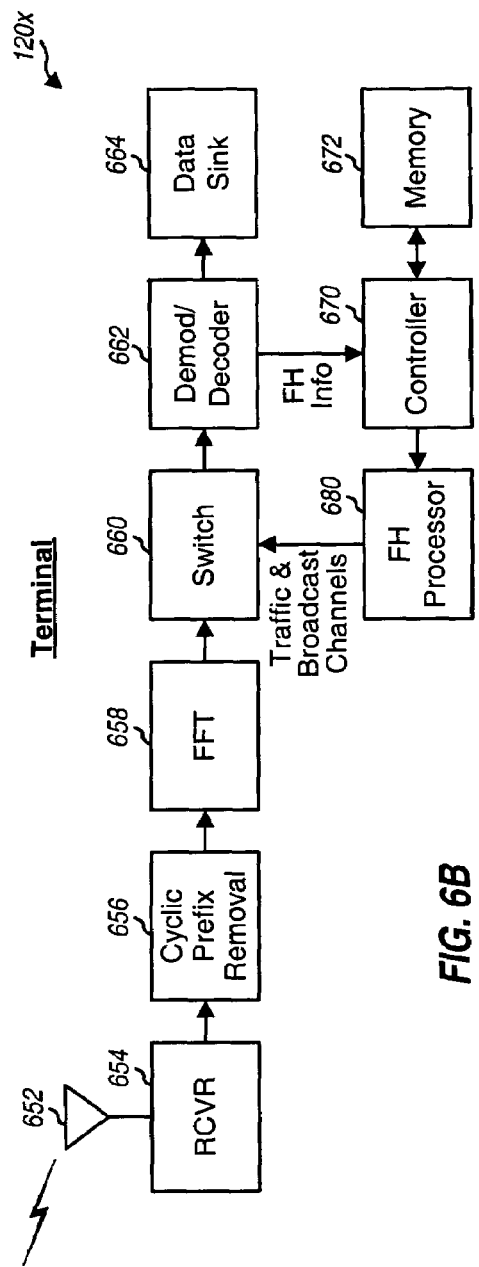

FIG. 6B shows a block diagram of an embodiment of a terminal 120x in OFDMA system 100. For simplicity, only the receiver portion of terminal 120x is shown in FIG. 6B.

The modulated signal transmitted by base station 110x is received by an antenna 652, and the received signal is provided to and processed by a receiver unit (RCVR) 654 to provide samples. The set of samples for one OFDM symbol period represents one received OFDM symbol. A cyclic prefix removal unit 656 removes the cyclic prefix appended to each OFDM symbol to obtain a received transformed symbol. An FFT unit 658 then transforms each received transformed symbol to the frequency domain using an N-point FFT to obtain N received symbols for the N subbands.

A switch 660 obtains the N received symbols for each OFDM symbol period and provides the received data symbols for traffic channel k and broadcast channel b to a demodulator/decoder 662. Since traffic channel k dynamically hops from subband to subband, switch 660 operates in unison with switch 616 in base station 110x to provide the received data symbols from the proper subbands for the traffic channel. The FH sequence provided to and used by switch 660 for traffic channel k is the same as the one used for switch 616 at base station 110x. This FH sequence is generated by an FH processor 680 based on either the FH function $f_{s_i}(k,T)$ or the modified FH function $\tilde{f}_{s_i}(k,T)$, depending on whether or not modification to the FH function is needed, as indicated by the FH information received from base station 110x. FH processor 680 also provides the FH sequence for broadcast channel b to switch 660, which uses this FH sequence to obtain the received data symbols from the proper subbands for broadcast channel b. The FH sequences at terminal 120x and base station 110x are synchronized.

Demodulator/decoder 662 demodulates, deinterleaves, and decodes the received data symbols for traffic channel k to provide decoded traffic data, which may be provided to a data sink 664 for storage. Demodulator/decoder 662 also demodulates, deinterleaves, and decodes the received data symbols for broadcast channel b to provide decoded broadcast data. In general, the processing by the units within terminal 120x is complementary to that performed by the corresponding units in base station 110x.

Controllers 630 and 670 direct the operation at base station 110x and terminal 120x, respectively. Memory units 632 and 672 provide storage for program codes and data used by controllers 630 and 670, respectively. Controller 630 may determine the FH function and the traffic channel to use for data transmission to terminal 120x, the FH function and the broadcast channel to use for broadcast, and so on. The pertinent FH information is signaled to terminal 120x. Controller 670 receives the FH information and directs FH processor 680 to generate the proper FH sequences used to receive the traffic data and broadcast data from base station 110x. Memory units 632 and 672 may also be used to store FH functions and/or FH sequences.

For clarity, FIGS. 6A and 6B show the transmission and reception, respectively, of data transmission sent on the forward link. Similar processing may be performed for data transmission on the reverse link.

The techniques described herein may be used for a frequency hopping OFDMA system as well as other wireless frequency hopping communication systems. For example, these techniques may be used for systems that employ other multi-carrier modulation techniques such as discrete multi-tone (DMT).

The techniques described herein may be used for soft handoff, broadcast services, and other types of communication whereby management of interference can improve performance. For example, these techniques may be used to improve the C/I of a disadvantaged user located at the edge of a sector. This user may experience excessive interference from nearby sectors and may not be able to achieve the required data rate. The FH functions for the nearby sectors may be modified temporarily to cause little or no interference to this user. The traffic channel for this disadvantaged user may be designated as a "protected traffic channel." The FH functions for users in other sectors may be modified to avoid or minimize collision with the protected traffic channel. For example, other users may transmit on other subbands or temporarily stop transmission whenever there is a collision with the protected traffic channel. Once this disadvantaged user has been served, the unmodified FH functions for these nearby sectors may be used.

The techniques described herein may be implemented by various means. For example, these techniques may be implemented in hardware, software, or a combination thereof. For a hardware implementation, the processing units (e.g., controllers 630 and 670, FH processors 640 and 680, and so on) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units (e.g., memory units 632 and 672 in FIGS. 6A and 6B) and executed by processors (e.g., controllers 630 and 670). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of managing interference in a wireless frequency hopping (FH) communication system, comprising:

obtaining a first FH function;

obtaining an identifier for a first traffic channel defined with the first FH function; modifying a second FH function based on the first FH function and the identifier for the first traffic channel to obtain a modified second FH function, wherein the second FH function is modified such that a second traffic channel defined with the modified second FH function and the first traffic channel are orthogonal or have low correlation; and using the second traffic channel for data transmission.

2. The method of claim 1, wherein the first FH function is used for users in soft handoff with at least two base stations in the system, and wherein the second FH function is used for users not in soft handoff and in communication with one of the at least two base stations.

3. The method of claim 1, wherein the first FH function is for a first base station in the system and the second FH function is for a second base station in the system.

4. The method of claim 1, wherein the first FH function is used for broadcast by at least two base stations in the system, and wherein the first traffic channel is used to transmit broadcast data.

5. The method of claim 1, further comprising:
obtaining an identifier for a third traffic channel defined with the second FH function, wherein the third traffic channel is associated with the first traffic channel, and wherein the second FH function is further modified based on the identifier for the third traffic channel.

6. The method of claim 5, wherein the modified second FH function is given as:

$$\tilde{f}_2(k, T) = \begin{cases} f_2(k, T) & \text{if } f_2(k, T) \neq f_1(r, T) \\ f_2(v, T) & \text{otherwise} \end{cases}$$

where r is the identifier for the first traffic channel,
k is an identifier for the second traffic channel,
v is the identifier for the third traffic channel,
T is indicative of system time,
is the first FH function, which indicates a particular subband to use for traffic channel r in time T,
is the second FH function, and
is the modified second FH function.

7. The method of claim 5, wherein the identifiers for the first, second, and third traffic channels are obtained via over-the-air signaling.

8. The method of claim 1, wherein the first traffic channel is associated with a first sequence of subbands determined by the first FH function and the identifier for the first traffic channel, and wherein the second traffic channel is associated with a second sequence of subbands determined by the modified second FH function and an identifier for the second traffic channel.

9. The method of claim 1, wherein the first and second FH functions are defined by first and second time shifts, respectively, of a pseudo-random number (PN) code.

10. The method of claim 1, wherein the second traffic channel is used for data transmission on a forward link from a base station to a terminal.

11. The method of claim 1, wherein the second traffic channel is used for data transmission on a reverse link from a terminal to a base station.

12. The method of claim 1, wherein the wireless communication system is an orthogonal frequency division multiple access (OFDMA) communication system.

13. An apparatus in a wireless frequency hopping (FH) communication system, comprising:
means for obtaining a first FH function;
means for obtaining an identifier for a first traffic channel defined with the first FH function;
means for modifying a second FH function based on the first FH function and the identifier for the first traffic channel to obtain a modified second FH function, wherein the second FH function is modified such that a second traffic channel defined with the modified second FH function and the first traffic channel are orthogonal or have low correlation; and
means for using the second traffic channel for data transmission.

14. An apparatus in a wireless frequency hopping (FH) communication system, comprising:
a processor operative to obtain a first FH function and an identifier for a first traffic channel defined with the first FH function, modify a second FH function based on the first FH function and the identifier for the first traffic channel to obtain a modified second FH function, an provide an FH sequence for a second traffic channel defined with the modified second FH function, wherein the second FH function is modified such that the second traffic channel and the first traffic channel are orthogonal or have low correlation; and
a switch operative to determine a particular one of a plurality of frequency subbands to use in each of a plurality of frequency hop periods based on the FH sequence for the second traffic channel.

15. The apparatus of claim 14, further comprising:
a modulator operative to modulate data for the second traffic channel and provide modulation symbols, and wherein the switch is operative to provide the modulation symbols to subbands determined by the FH sequence for the second traffic channel.

16. The apparatus of claim 14, further comprising:
a demodulator operative to obtain, from the switch, received modulation symbols on subbands determined by the FH sequence for the second traffic channel and to demodulate the received modulation symbols to provide demodulated data for the second traffic channel.

17. A terminal comprising the apparatus of claim 14.

18. A base station comprising the apparatus of claim 14.

19. A processor readable media for storing instructions operable to:
obtain a first frequency hopping (FH) function;
obtain an identifier for a first traffic channel defined with the first FH function; and
modify a second FH function based on the first FH function and the identifier for the first traffic channel to obtain a modified second FH function, wherein the second FH function is modified such that a second traffic channel defined with the modified second FH function and the first traffic channel are orthogonal or have low correlation, and wherein the second traffic channel is used for data transmission on a forward link or reverse link.

20. A method of managing interference in a wireless frequency hopping (FH) communication system, comprising:
receiving an assignment of a first traffic channel defined with a first FH function;
using the first traffic channel for communication with a first base station;
receiving an assignment of a second traffic channel defined with a second FH function, wherein the first and second FH functions are orthogonal or have low correlation; and
using the second traffic channel for communication with the first base station and a second base station.

21. The method of claim 20, wherein the second base station is associated with a third FH function for defining a third traffic channel used for communication with the second base station, wherein the second and third FH functions are orthogonal or have low correlation, and wherein the first FH function is pseudo-random with respect to the third FH function.

22. The method of claim 20, wherein the first and second FH functions are defined by first and second time shifts, respectively, of a pseudo-random number (PN) code.

23. The method of claim 20, wherein the first traffic channel is used to send a first transmission on a forward link from the first base station to a terminal, and wherein the second traffic channel is used to send a second transmission on the forward link from the first and second base stations to the terminal.

24. The method of claim 20, wherein the first traffic channel is used to send a first transmission on a reverse link from a terminal to the first base station, and wherein the second traffic channel is used to send a second transmission on the reverse link from the terminal to the first and second base stations.

25. The method of claim 20, wherein the wireless communication system is an orthogonal frequency division multiple access (OFDMA) communication system.

26. An apparatus in a wireless frequency hopping (FH) communication system, comprising:
 means for receiving an assignment of a first traffic channel defined with a first FH function;
 means for using the first traffic channel for communication with a first base station;
 means for receiving an assignment of a second traffic channel defined with a second FH function, wherein the first and second FH functions are orthogonal or have low correlation; and
 means for using the second traffic channel for communication with the first base station and a second base station.

27. An apparatus in a wireless frequency hopping (FH) communication system, comprising:
 a processor operative to receive an assignment of a first traffic channel defined with a first FH function and provide a first FH sequence for the first traffic channel, wherein the first traffic channel is used for communication with a first base station; and
 a switch operative to determine a particular one of a plurality of frequency subbands to use in each of a first plurality of frequency hop periods based on the first FH sequence for the first traffic channel, and
 wherein the processor is further operative to receive an assignment of a second traffic channel defined with a second FH function and provide a second FH sequence for the second traffic channel, wherein the second traffic channel is used for communication with the first base station and a second base station, and wherein the switch is further operative to determine a particular one of a plurality of frequency subbands to use in each of a second plurality of frequency hop periods based on the second FH sequence for the second traffic channel.

28. A method of managing interference in a wireless frequency hopping (FH) communication system, comprising:
 receiving a first transmission on a first traffic channel from a first base station, wherein the first traffic channel is defined with a first FH function associated with the first base station; and
 receiving a second transmission on a second traffic channel from the first base station and a second base station, wherein the second traffic channel is defined with a second FH function, wherein a third FH function is associated with the second base station, wherein the second FH function is orthogonal to or has low correlation with both the first and third FH functions, and wherein the first FH function is pseudo-random with respect to the third FH function;
obtaining an identifier for a third traffic channel defined with the second FH function, wherein the third traffic channel is associated with the first traffic channel, and wherein the second FH function is further modified based on the identifier for the third traffic channel; wherein the modified second FH function is given as:

$$\tilde{f}_2(k, T) = \begin{cases} f_2(k, T) & \text{if } f_2(k, T) \neq f_1(r, T) \\ f_2(v, T) & \text{otherwise} \end{cases}$$

where r is the identifier for the first traffic channel,
k is an identifier for the second traffic channel,
v is the identifier for the third traffic channel,
T is indicative of system time,
 is the first FH function, which indicates a particular subband to use for traffic channel r in time T, is the second FH function, and
is the modified second FH function.

29. The method of claim 28, wherein the second transmission includes broadcast data.

30. An apparatus in a wireless frequency hopping (FH) communication system, comprising:
 means for receiving a first transmission on a first traffic channel from a first base station, wherein the first traffic channel is defined with a first FH function associated with the first base station; and
 means for receiving a second transmission on a second traffic channel from the first base station and a second base station, wherein the second traffic channel is defined with a second FH function, wherein a third FH function is associated with the second base station, wherein the second FH function is orthogonal to or has low correlation with both the first and third FH functions, and wherein the first FH function is pseudo-random with respect to the third FH function;
means for obtaining an identifier for a third traffic channel defined with the second FH function, wherein the third traffic channel is associated with the first traffic channel, and wherein the second FH function is further modified based on the identifier for the third traffic channel;
wherein the modified second FH function is given as:

$$\tilde{f}_2(k, T) = \begin{cases} f_2(k, T) & \text{if } f_2(k, T) \neq f_1(r, T) \\ f_2(v, T) & \text{otherwise} \end{cases}$$

where r is the identifier for the first traffic channel,
k is an identifier for the second traffic channel,
v is the identifier for the third traffic channel,
T is indicative of system time,
 is the first FH function, which indicates a particular subband to use for traffic channel r in time T, is the second FH function, and
is the modified second FH function.

* * * * *